(12) United States Patent
Nickeas et al.

(10) Patent No.: US 7,096,882 B2
(45) Date of Patent: Aug. 29, 2006

(54) VALVE SECURITY DEVICE

(75) Inventors: Mark Nickeas, Westlake Village, CA (US); Martin Nickeas, Oxnard, CA (US)

(73) Assignee: Flow Security Systems, Inc., Camarillo, CA (US)

( * ) Notice: Subject to any disclaimer, the term of this patent is extended or adjusted under 35 U.S.C. 154(b) by 0 days.

(21) Appl. No.: 11/028,021

(22) Filed: Jan. 3, 2005

(65) Prior Publication Data

US 2005/0155649 A1   Jul. 21, 2005

Related U.S. Application Data

(63) Continuation of application No. 10/758,339, filed on Jan. 15, 2004, now Pat. No. 6,920,894.

(51) Int. Cl.
   *F16K 27/08*   (2006.01)
(52) U.S. Cl. .................. 137/385; 137/382; 70/178; 70/180; 70/186
(58) Field of Classification Search ................ 137/385, 137/382; 70/178, 180, 186
   See application file for complete search history.

(56) References Cited

U.S. PATENT DOCUMENTS

| | | | |
|---|---|---|---|
| 3,448,762 A | 6/1969 | Schmitt | |
| 4,471,801 A | 9/1984 | Lange | |
| 4,638,650 A | 1/1987 | Hafele | |
| 4,709,720 A | 12/1987 | Russo | |
| 5,116,018 A | 5/1992 | Friemoth et al. | |
| 5,213,308 A | 5/1993 | Jeromson et al. | |
| 5,236,172 A | 8/1993 | Friemoth et al. | |
| 6,170,306 B1 | 1/2001 | Kitley et al. | |
| 6,382,001 B1 | 5/2002 | Neeley et al. | |
| 6,453,707 B1 | 9/2002 | Nishimura et al. | |
| 6,467,500 B1 | 10/2002 | Fridlyand | |
| 2002/0166985 A1 | 11/2002 | Hirose et al. | |

*Primary Examiner*—A. Michael Chambers
(74) *Attorney, Agent, or Firm*—Vedder Price Kaufman & Kammholz

(57) ABSTRACT

A valve security device for releasably securing a fluid flow valve in an inoperable position including an inner body adapted to be disposed about the valve actuator such that rotation of the inner body effects corresponding rotation of the actuator to open and close the valve and an outer body rotatably mounted about the inner body. A valve cap defining a secondary actuator is mounted on the outer body. An operating pin assembly is carried by the outer body which, in an extended position, operatively couples the outer body to the inner body such that the valve can be controlled by the secondary actuator. In a retracted position, the pin assembly uncouples the outer and inner bodies such that the outer body is freely rotatable on the inner body. A lock secures the operating pin assembly in the retracted position thereby releasably securing the valve in an inoperable position.

30 Claims, 5 Drawing Sheets

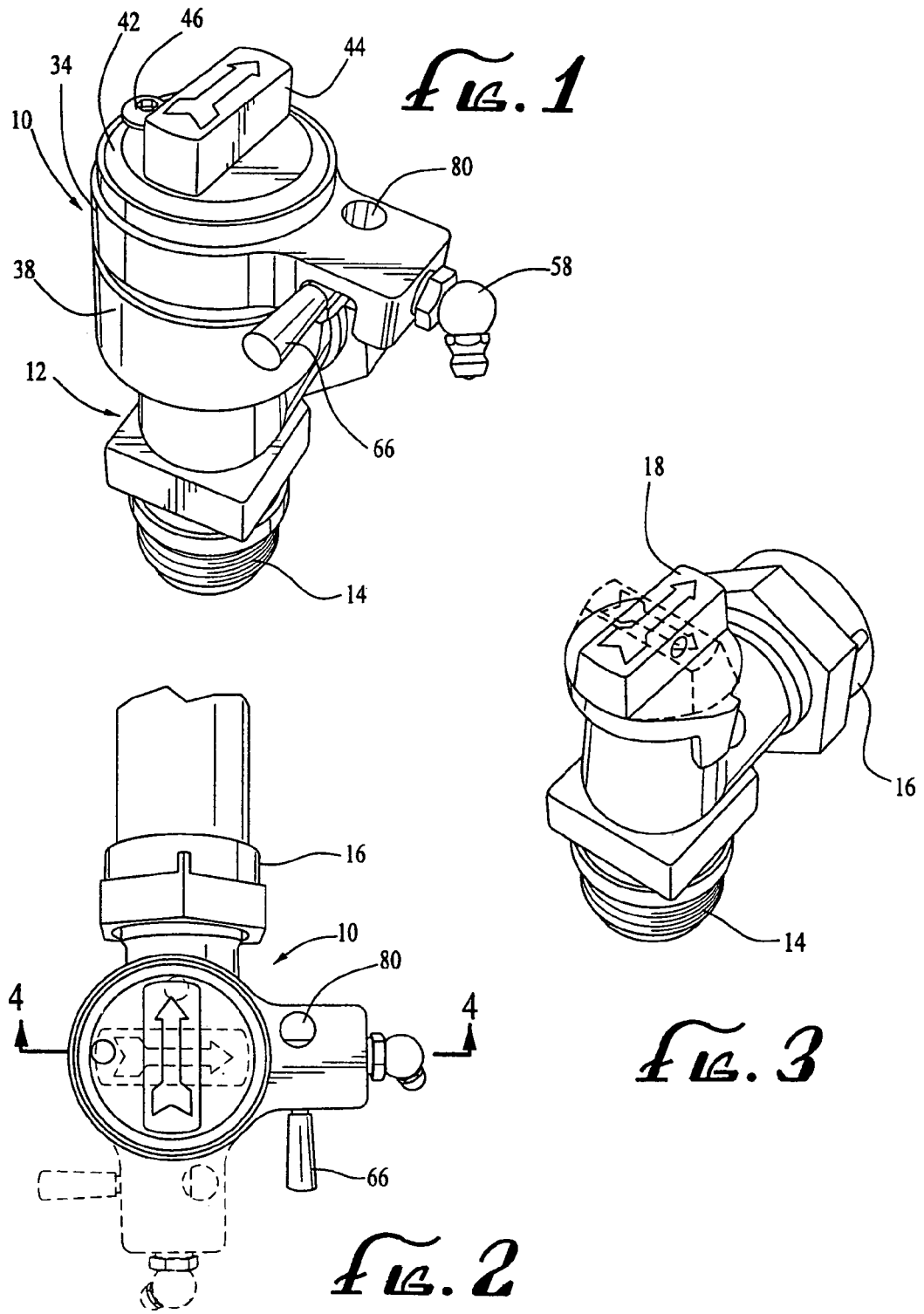

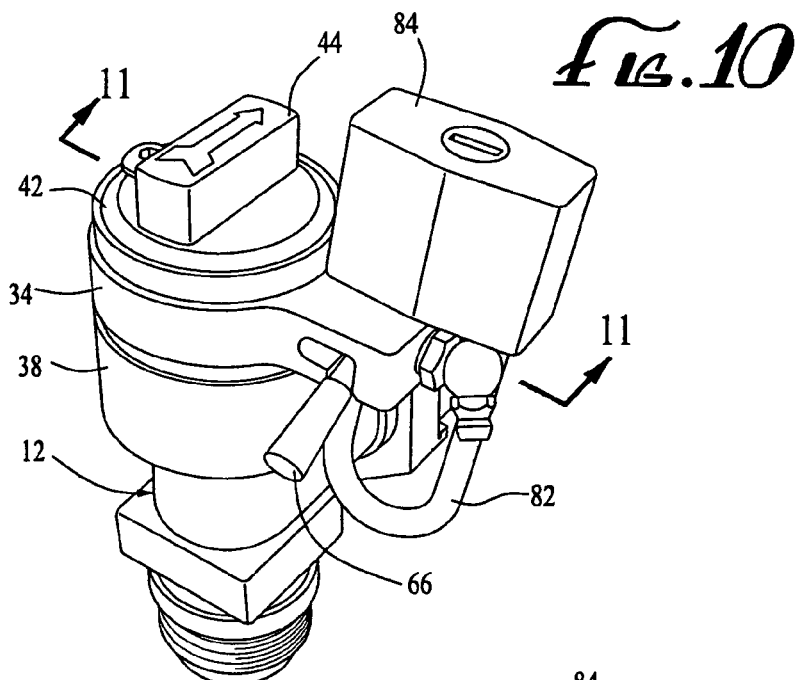
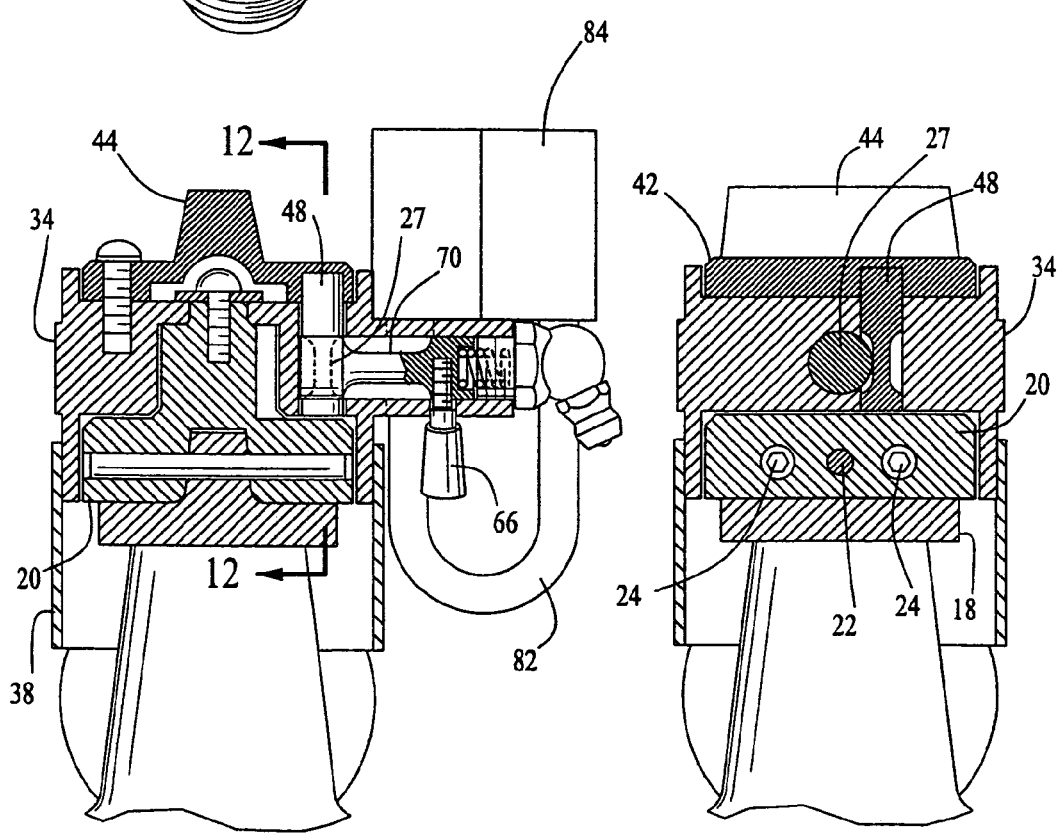

VALVE SECURITY DEVICE

RELATED APPLICATION

This application is a continuation of U.S. patent application Ser. No. 10/758,339 entitled, "VALVE SECURITY DEVICE," filed Jan. 15, 2004 now U.S. Pat. No. 6,920,894.

BACKGROUND OF THE INVENTION

The present invention relates to valve security devices and, more particularly, to a device that is adaptable for use on a wide variety of fluid flow valves, both liquid and gas, to prevent access to the valve actuating key with varying degrees of security depending on the particular application.

Different levels of security are desirable in valve protection devices depending on the nature of the fluid flow line in which the valve is being used. For example, to provide a security device for a valve on a fire hydrant, it generally would be undesirable to employ a security device that could not be forcibly circumvented with conventional equipment such as a heavy-duty bolt cutter. If such a device was used and the only key that could unlock the device to provide access to the actuating key on the hydrant was lost or temporarily misplaced, firefighters could be prevented from accessing the water in a time of acute emergency. However, some form of locking or security device on fire hydrants is desirable in many areas, particularly in areas where the hydrants may be subject to malicious mischief and rural and farming areas where water may be in short supply and great demand. Such situations have led to increasing incidences of water theft. In such areas prone to water theft, some form of protective device that would provide greater security than a simple deterrent to mischief, yet still could be forcibly removed in an emergency, would be desirable. On other water lines which are not used for emergency applications such as firefighting, a greater degree of security would be desirable. Main water valves for residential housing is another example of where an economical yet efficient valve security device would be very desirable in order to prevent non-paying customers from simply disabling the lock typically placed on such valves by the water company with a simple hammer. In hazardous chemical lines and other applications, maximum security protection devices for the valves would be desired wherein the application of virtually any degree of force would still leave the valve disabled and inoperable. It would be highly desirable if a valve security device could be developed that would meet these different needs. Such a device would be readily adaptable for providing different levels of security for different applications. It would also be desirable if such a security device could be readily modified for use with different valve configurations. The present invention provides such a security device.

SUMMARY OF THE INVENTION

Briefly, the present invention comprises a fluid flow valve security device that fits about and is secured to the actuating key on a valve head to selectively prevent access thereto and the unauthorized opening of the valve. The security device includes an inner body portion, an outer body portion, a protective sleeve, a valve cap and an operating pin assembly. The inner body portion is disposed about and operatively coupled to the valve actuating key such that rotation of the inner body portion effects corresponding rotation of the key to open and close the valve. The outer body portion of the security device is disposed about and rotatably mounted on the inner body portion. The valve cap is mounted atop the outer body portion for rotational movement therewith and defines a secondary actuating key thereon preferably corresponding in configuration to the actuating key on the valve head. The protective sleeve is secured between and freely rotatable about the interface of the inner and outer body portions and the actuating key on the valve head so as to prevent unauthorized access thereto.

The security device of the present invention is controlled by an operating pin assembly that is manually movable between an extended position and a retracted position. In its extended position, the pin assembly couples the outer body portion of the security device to the inner body portion thereof such that the secondary actuating key is operatively coupled to the actuating key on the valve head whereby the valve can be opened and closed by the secondary actuating key. If desired, with the operating pin assembly in the extended position the valve cap can be removed from the outer body portion to disassemble and remove the security device from the valve head. In the retracted position, the outer body portion is uncoupled from the inner body portion of the device and the valve cap is coupled to the outer body portion such that the outer body portion and valve cap are free wheeling on and about the inner body portion and the valve cap can not be removed from the outer body portion. Thus, with the operating pin assembly in the retracted position, the security device can not be removed from the valve head and the secondary key on the valve cap is not operatively coupled to the valve head key, totally disabling the fluid flow valve. The protective sleeve is also freely rotatable about the interface of the inner and outer body portions, preventing one from obtaining unauthorized access to said interface or the valve head actuating key in an effort to remove or overpower the security device.

To prevent unauthorized movement of the operating pin assembly from the retracted position to the extended position to open the valve and to inhibit the unauthorized locking of the valve in the operative mode, a channel is provided in an extended portion of the outer body of the device adjacent the operating pin assembly which, with the assembly in the retracted position, is adapted to receive the shackle of a padlock or tamper-proof lock having an inaccessible shackle, depending on the application. With the shackle extending through the channel, the operating pin assembly is held in the retracted position disabling the valve. With the operating pin assembly in the extended position, the channel is blocked by the pin assembly preventing the insertion of a lock shackle and the disabling of the valve.

Through the aforesaid configuration, when the valve security device of the present invention is used to secure a valve of the type that might need to be opened in an emergency situation such as a fire hydrant, a conventional padlock could be used to secure the operating pin assembly and a fireman, policeman or other person, in an emergency, could cut or saw through the shackle of the padlock to remove the lock and reestablish control over the valve head. For those applications in which higher security is required, a tamper-proof lock employing, for example, an inaccessible T-shaped shackle could be utilized which would prevent one from overcoming the lock without the key. Thus, the present invention provides a highly versatile locking device for use in a wide variety of applications.

BRIEF DESCRIPTION OF THE DRAWINGS

FIG. 1 is a perspective view of the valve security device of the present invention in place on a valve head. The valve security device is illustrated in FIG. 1 in the operative position, allowing the valve head to be moved between an open and closed position.

FIG. 2 is a top plan view of the locking device of the present invention in place on a valve head in the operative position, utilizing solid and phantom lines to show the movement of the device between a valve open position (solid lines) and valve closed position (phantom lines).

FIG. 3 is a perspective view of the valve head without the locking device mounted thereon, utilizing solid and phantom lines to illustrate the movement of the actuating key on the top of the valve head between the valve open position (solid lines) and valve closed position (phantom lines).

FIG. 10 is a perspective view of the valve security device of the present invention secured on the valve head and locked in the disabled or free spinning or secured position.

FIG. 11 is a sectional view taken along the line 11—11 in FIG. 10.

FIG. 12 is a sectional view taken along the line 12—12 in FIG. 11.

DESCRIPTION OF THE PREFERRED EMBODIMENT

Figure 4:
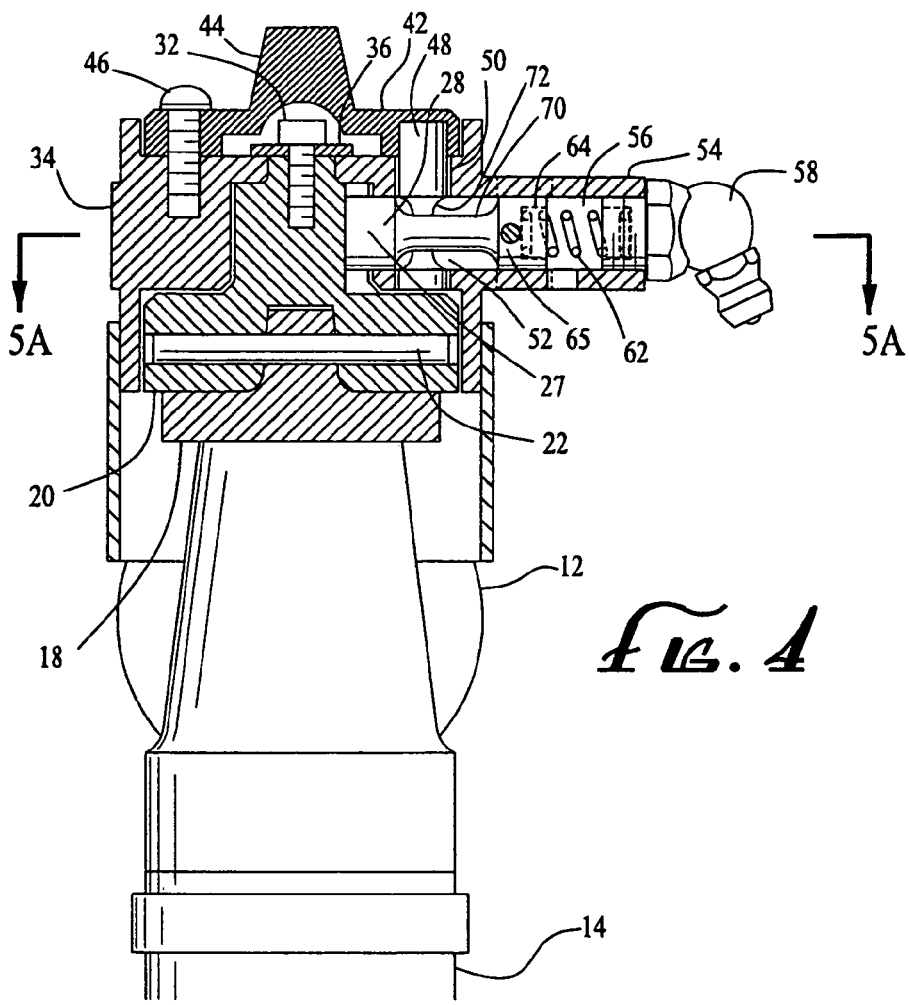
FIG. 4 is a sectional view of the valve security device of the present invention secured to the valve head and disposed in the operative position.

The valve security device 10 is shown in the accompanying drawings secured to a conventional residential angle stop valve head 12 of the type that is widely used by the Department of Water and Power in the Southern California area and elsewhere. It is to be understood, however, that the security device of the present invention is readily adaptable for use with a variety of fluid flow valves. The valve head 12 includes a water inlet 14, outlet 16 and a key or actuator 18 for actuating the internal valve components (not shown) to regulate the water flow therethrough. The open valve position is illustrated in FIG. 3 in solid lines and the closed position is illustrated in phantom lines.

Figure 6:
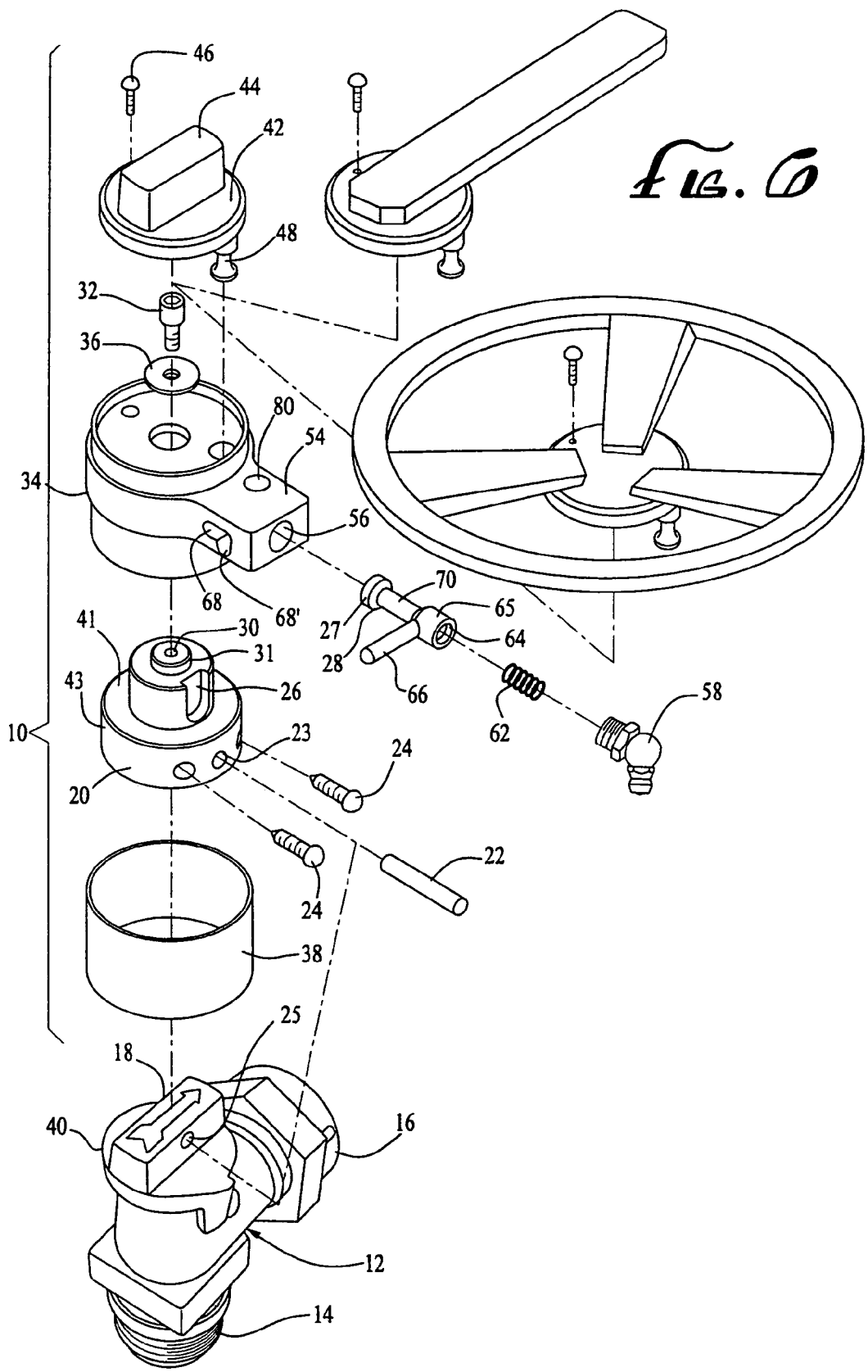
FIG. 6 is an exploded perspective view illustrating the components of the valve security device disposed above a valve head and including alternate embodiments of the valve cap showing the use of a handle and wheel for opening and closing the valve.
Figure 7:
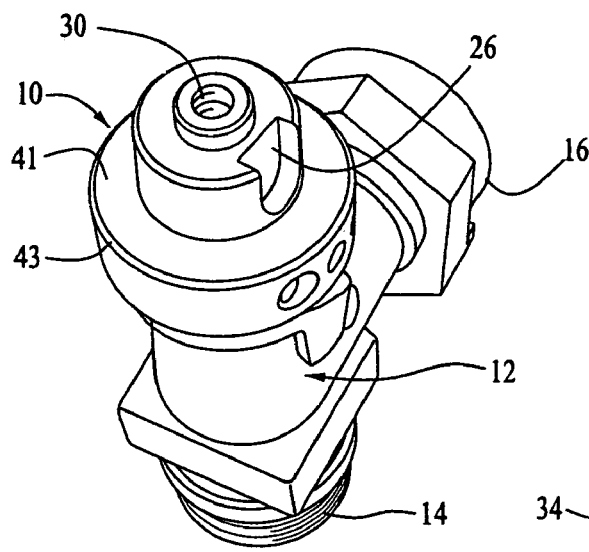
FIG. 7 is a perspective view of the valve head with only the inner body portion of the security device in place thereon.
Figure 8:
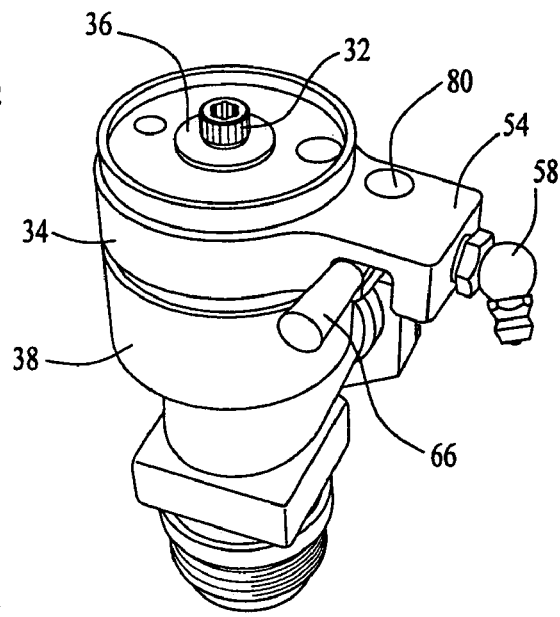
FIG. 8 is a perspective view of the locking device of the present invention in place on a valve head with the valve cap removed.
Figure 9:
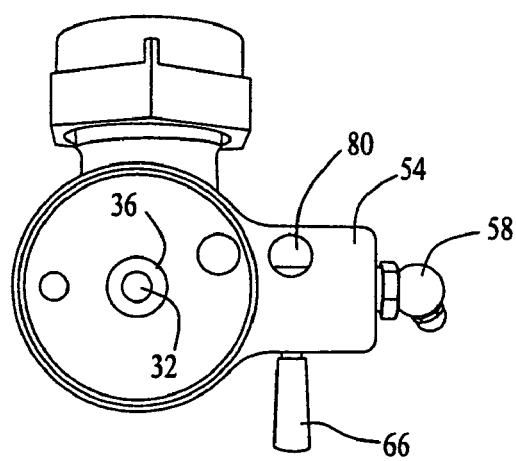
FIG. 9 is a top plan view of the components illustrated in FIG. 8.

The individual components of the valve security device 10 are perhaps best illustrated in the exploded view of FIG. 6. Those components include an inner body 20 which is adapted to fit over and engage the actuator key 18 on the valve head 12. As seen in FIG. 4, the interior of inner body 20 is configured to engage and, as shown, preferably mate with the surfaces of the valve actuator key 18. For valves having differently sized and/or configured actuators, the inner body portion 20 of the security device 10 would have correspondingly sized and configured interior contact surfaces. For the valve shown in the drawings, a retention pin 22 and a pair of set screws 24 provide the securement of the inner body 20 to the valve head 12 such that rotation of the inner body 20 effects corresponding rotation of the valve actuator 18. The retention pin 22 extends through aperture 23 in the inner body portion 20 of the security device and through an aperture 25 formed in the valve actuator 18 to prevent the inner body 20 from being pulled from the valve head. This securement is also illustrated, for example, in FIG. 4. The inner body 20 also defines a recess or slot 26 which is adapted to selectively receive the inner head portion 27 of the operating pin 28 to effect an operative coupling of the inner body to the outer body 34 of the security device 10 for rotation of the valve head actuator 18 with the security device 10 in place as will be described.

A threaded aperture 30 is provided in an upwardly projecting boss 31 on the inner body 20 which is adapted to receive an Allen screw 32 for securement of the outer body 34 to the inner body 20. A washer 36 is disposed between boss 31 and the head of fastener 32. Alternatively, the head of screw 32 could be enlarged to effect the securement of the outer body of the security device 10 to the inner body. A free spinning protective cylindrical metal sleeve 38 is provided between the valve head 12 and the outer body 34 to prevent unauthorized access to valve head area 40 (see FIG. 6) which might otherwise be gripped by a suitable tool and forcibly rotated to effect unauthorized opening of the valve head 12. An anti-friction disc 41 formed of Teflon® or similar low friction material is provided on the annular flat surface 43 of the inner body 20 for reasons to be noted later herein. A valve cap 42 is secured to the upper end of the outer body 34 to prevent unauthorized disassembly of the valve security device and to provide a secondary key or actuator 44 for the opening and closing the valve head 12. The valve cap 42 is secured to the outer body by a threaded fastener 46 and by means of a cap retaining pin 48. The secondary actuator 44 carried by cap 42 can be of the identical configuration as the valve head actuator 18 or, if desired, of an elongated or circular configuration (also shown in FIG. 6), or of any other desired shape.

Figure 5A:
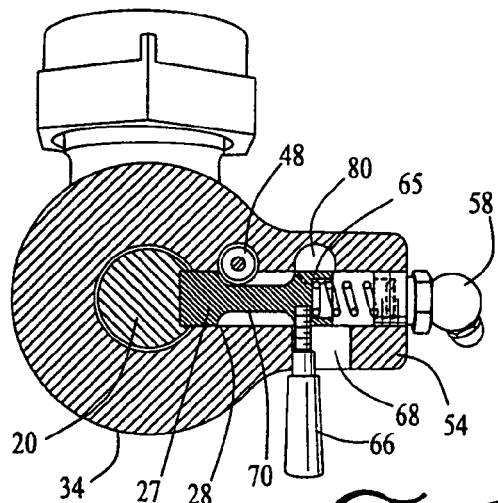
FIG. 5A is a partial sectional view taken along the line 5A—5A in FIG. 4.
Figure 5B:
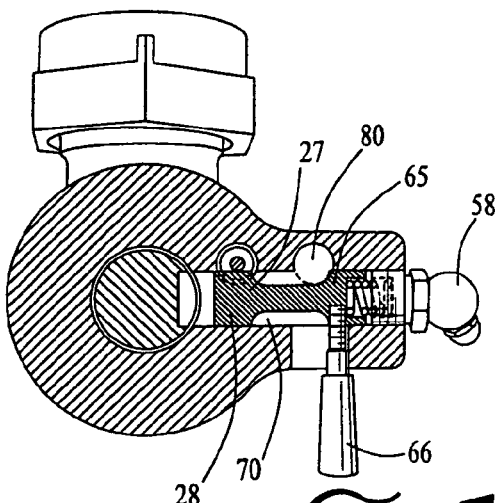
FIG. 5B is a partial sectional view similar to 5A but illustrating the valve security device in the inoperative position.

As perhaps best seen in FIGS. 4 and 5, the valve cap retaining pin 48 projects from the underside of the valve cap 42, through an aperture 50 in the upper end of the outer body 34 and into an interior area 52 proximate the slot 26 in the inner body 20. The outer body 34 of the security device 10 additionally includes a hollow, radially projecting arm portion 54 defining an elongated interior chamber 56 communicating with interior area 52. The operating pin 28 is slidably disposed within chamber 56 and area 48 as seen in FIGS. 4 and 5. A lubrication nipple 58 threadably engages the extended end of arm portion 54 so as to close the outer end of chamber 56 such that a coil spring 62 can extend between the lubrication nipple 58 and a seat 64 formed in outer end portion 65 of the operating pin 28. So disposed, the coil spring 62 continually urges the operating pin 28 to the inner or extended position seen in FIG. 5. A handle 66 for selectively moving the operating pin 28 between an inner and outer position is threadably secured to the operating pin. An L-shaped slot 68 is provided in the arm portion 54 of the outer body 34 to accommodate handle 66 and hold the operating pin 28 in the outer or retracted position when the handle is pushed downwardly into the offset portion 68' of slot 68.

The operating pin 28 defines a reduced diameter portion 70 between its head portion 27 and end portion 65. Similarly, the vertically disposed cap retaining pin 48 defines a reduced diameter portion 72 intermediary of its ends. The reduced diameter portion 72 of the cap retention pin 48 is disposed within the interior area 52 of the outer body as seen in FIG. 4. In the fully extended position illustrated in FIGS. 4 and 5A, the head portion 27 of the operating pin 28 projects into the slot 26 in the inner body 20, operatively connecting the outer body 34 to the inner body 20. In the fully retracted position, see FIGS. 5B and 10–12, the head portion of the operating pin is withdrawn from slot 26, allowing the outer body 34 to rotate freely about the inner body 20.

Referring again to FIGS. 4 and 5A, the outer body 34 is secured to the inner body 20 by virtue of the projection of the head portion 27 of operating pin 28 into the slot 26 in the inner body. The valve cap 42 is in turn secured to the outer body by virtue of threaded fastener 46 and cap retaining pin 48. Accordingly, engaging the actuator 44 defined by valve cap 42 with the appropriate tool and rotating the cap will effect corresponding rotation of the outer body 34 and inner body 20. The engagement of the valve head actuator 18 by the inner body 20 effects corresponding rotation of the valve head actuator 18 such that the valve head 12 can be effectively operated by the actuator 44 on the valve cap 42. As indicated above, the key-shaped actuator 44 could be replaced by a suitable handle, valve wheel or other configuration as seen in FIG. 6.

In the above described operative mode, the valve cap 42 can be readily removed to disengage the security device 10 from the valve head 12 for repair and replacement purposes. This is accomplished by simply unscrewing the threaded fastener 46 and lifting the valve cap vertically off the outer body 34. Such removal is permitted due to the positioning of the reduced diameter portion 70 of the operating pin 28 relative to the reduced diameter portion 72 of the cap retaining pin 48 such that the operating pin does not obstruct the upward movement of the retaining pin. If the larger diameter head portion 27 of the operating pin were in the path of pin 48, as is the case in the inoperative mode when the operating pin is in the retracted position (see FIG. 5B), the head of the operating pin would prevent withdrawal of the retaining pin 48 preventing removal of the valve cap 42.

To lock the valve security device 10 such that the valve head cannot be opened without authorization, the operating pin 28 is urged outwardly against the force of spring 62 by means of handle 66, disengaging the head portion 27 of pin 28 from the slot 26 in the inner body portion 20. By pressing the handle 66 downwardly in the retracted position, the handle will move into the offset portion 68' of the L-shaped slot 68 so as to hold the operating pin 28 in its retracted position. Because of the reduced diameter portion 72 of the cap retaining pin 48, pin 48 does not obstruct the outward movement of the operating pin 28 as just described. With the operating pin in the retracted position, the locking channel 80 formed in the arm portion 54 of the outer body 34 is no longer partially obstructed by the end portion 65 of the operating pin 28 as is the case when the pin is in the extended position (see FIGS. 5A and 5B). This allows the bar, pin or shackle 82 on a lock 84 to be inserted through channel 80 and locked in place as seen in FIGS. 10–12. For low security applications, a conventional padlock would be used with the valve security device and the shackle of the lock would be inserted through the locking channel 80 as is shown in the drawings. It is to be understood that higher security locks would be utilized with security device 10 for higher security applications, as will be later discussed. The operation of the valve security device 10 will be discussed with reference to a lock 84 and its associated locking bar 82 although it is to be understood that the term "locking bar" or "bar" is intended to include shackles, pins, locking bolts, etc.

so as not to unduly restrict the types of locks with which the security device 10 of the present invention can be used.

With the lock 84 in place, the outer body 34 of the security device, the lock 84 and the valve cap 42 are free wheeling about the inner body 20. Thus, rotation of the actuator 44 on the valve security device 10 simply rotates the outer body 34 of the device but does not effect corresponding rotation of the inner body 20. The outer body 34 and lock 84 cannot be lifted from the inner body 20 due to the threaded engagement of the hidden fastener 32 which, while allowing relative rotation between the inner and outer bodies, holds the outer body to the inner body. Upon removal of the exposed threaded fastener 46, the valve cap 42 is still held in place, preventing access to fastener 32, due to the interference created between the head portion 27 of the operating pin 28 and the cap retaining pin 48. The cap retaining pin 48 is prevented from being withdrawn from outer body 34 through aperture 50 therein by the larger diameter head portion of the operating pin as shown in FIGS. 11 and 12. Because of the interference created by the operating pin, the cap cannot be removed and thus the valve head 12 is effectively disabled due to the free spinning cap and outer body and the lack of any operative engagement of the cap 42 to the inner body 20.

The inclusion of the low friction disc 41 on the flat annular surface 43 of the inner body will prevent one from being able to operate the valve head by using an elongated lever arm on actuator 44 and attempting to torque one side of the cap 42 and outer body 34 downwardly with respect to the inner body 20 such that underside of the outer body would bear against surface 43 with sufficient force to enable one to actually turn the inner body and thus circumvent the security device. With the low friction disc 41 covering inner body surface 43, sufficient friction could not be generated on the inner body to operate the valve head in such a manner.

In order to reconnect the operative engagement between the valve security device 10 and the valve head 12, it is necessary to remove the lock 84. With the lock in place, the locking bar 82 prevents the larger diameter outer end portion 65 of the operating pin 28 from passing thereby and thus prevents any inward movement of the pin 28 into engagement with the inner body 20. With the lock removed, the coil spring 62 will urge the operating pin 28 against the inner body 20. By simply rotating the outer body 34 relative to the inner body, the head portion 27 of the operating pin will come into alignment with the slot 26 in the inner body 20, whereupon the coil spring 62 will urge the head 27 of the operating pin 28 into slot 26, reestablishing the operative connection between the inner and outer bodies of the security device.

The removal of lock 84 from device 10 can be accomplished in its intended way through the use of the lock key. Alternatively, in an emergency situation, a fireman, policeman or other person, could cut or saw through the locking bar of the lock to remove the lock and reestablish control over the valve head 12 assuming that a lower security lock such as a convention padlock were used to secure device 10. The ability to reestablish such a connection when the key is not available is quite important in many applications where an emergency situation dictates reactivation of the valve head. For those applications in which higher security is required, a tamperproof lock employing, for example, a T-shaped locking bar could be utilized which would prevent one from overpowering the lock without the key without destroying the valve as well. Such applications would be for very high security applications where the use of the key was deemed absolutely necessary by the end user.

Various changes and modifications also may be made in carrying out the present invention without departing from the spirit and scope thereof. Insofar as these changes and modifications are within the purview of the appended claims, they are to be considered as part of the present invention.

We claim:

1. A valve security device for a fluid flow valve having a valve actuator, said device comprising:
   an inner body portion adapted to engage the valve actuator;
   an outer body portion mounted on said inner body portion;
   a valve cap defining a secondary actuator thereon and being operatively coupled to said outer body portion for actuating the valve actuator; and
   an operating pin assembly carried by said outer body portion and movable between a first position wherein said pin assembly operatively couples said outer body portion to said inner body portion to allow actuation of the valve actuator via the valve cap and a second locked position wherein the pin assembly uncouples said outer body portion from said inner body portion so that said outer body portion is freely rotatable relative to said inner body portion and actuation of the valve actuator via the valve cap is prevented.

2. The valve security device of claim 1 a lock carried by said outer body portion and adapted to lock the pin assembly in the second position.

3. The valve security device of claim 2 wherein said lock is removable.

4. The valve security device of claim 3 wherein said outer body portion includes a locking channel, said operating pin assembly being displaced from said channel in said second position such that a portion of said lock can be extended through said channel and locked in place, wherein said portion of said lock obstructs at least a portion of said channel to secure the pin assembly in the second position.

5. The valve security device of claim 1 wherein said valve cap is removably secured to said outer body portion, and wherein said pin assembly operatively couples said valve cap to said outer body portion so as to prevent removal of said valve cap from said outer body portion whereby removal of said outer body portion from said inner body portion is prevented.

6. The valve security device of claim 1 wherein said operating pin assembly includes an engagement pin, a handle for moving said pin between an extended position corresponding to the pin assembly being in said first position and a retracted position corresponding to said valve assembly being in the second position and a spring for biasing said pin to the extended position, said pin engaging a contact surface on said inner body portion in said extended position and operatively coupling said outer body portion to said inner body portion.

7. The valve security device of claim 6 wherein said outer body portion includes a channel, said engagement pin being disposed in said channel and including a reduced diameter portion, and wherein said valve cap is removably secured to said outer body portion and includes a retaining member having a reduced diameter portion, wherein when said engagement pin is in said extended position, said reduced diameter portion of said engagement pin is adjacent said reduced diameter portion of said retaining member so as to permit removal of said valve cap from said outer body portion of said device, and wherein when said engagement pin is in said retracted position, said reduced diameter portion of said engagement pin is offset from said reduced diameter portion of said retaining member such that said engagement pin obstructs the movement of said retaining member to prevent removal of said valve cap from said outer body portion.

8. The valve security device of claim 7, further comprising a fastening member releasably securing said outer body portion to said inner body portion, said fastening member being disposed below and covered by said valve cap, wherein said fastening member is accessible by having the engagement pin in the extended position to permit removal of said valve cap.

9. The valve security device of claim 1 wherein said inner and outer body portions define overlapping portions and including a protective cylindrical sleeve disposed about said overlapping portions so as to prevent unauthorized access to said inner body portion and the valve actuator when said operating pin assembly is in said second position.

10. The valve security device of claim 9 wherein said sleeve is freely rotatable about said overlapping portions.

11. The valve security device of claim 1 including an attachment member carried by said inner body portion of said device and adapted to engage a portion of said fluid flow valve for securing said inner body portion to the actuator on the valve and wherein said outer body portion extends about said attachment member to prevent unauthorized access thereto when said operating pin assembly is in said second position.

12. The valve security device of claim 1 including a friction reducing member disposed about a portion of said inner body portion of said security device and between said inner and outer body portions thereof.

13. A valve security device for use with a lock of the type having a locking bar, said device comprising:
    an inner body portion adapted to engage an valve actuator of a fluid flow valve to open and close the valve;
    an outer body portion mounted on said inner body portion and defining a locking channel therein;
    a valve cap defining a secondary actuator thereon and being operatively coupled to said outer body portion;
    an operating pin assembly carried by said outer body portion and movable between a first position wherein said pin assembly operatively couples said outer body portion to said inner body portion to allow actuation of the valve actuator via the valve cap and a second locked position wherein said pin assembly uncouples said outer body portion from said inner body portion so that said outer body portion is freely rotatable relative to said inner body portion and actuation of the valve actuator via the valve cap is prevented;
    wherein said valve cap is removably secured to said outer body portion, and wherein said pin assembly operatively couples said valve cap to said outer body portion when the pin assembly is in the second position so as to prevent removal of said valve cap from said outer body portion whereby removal of said outer body portion from said inner body portion is prevented; and
    wherein inserting the locking bar through said locking channel when the operating pin assembly is in the second position secures said outer body portion in the second position.

14. The valve security device of claim 13 wherein said outer body portion includes a locking channel, said operating pin assembly being displaced from said channel in said second position such that a portion of said locking bar can be extended through said channel and locked in place, wherein said portion of said locking bar obstructs at least a portion of said channel to secure the pin assembly in the second position.

15. The valve security device of claim 13 wherein said operating pin assembly includes an engagement pin, a handle for moving said pin between an extended position corresponding to the pin assembly being in said first position and a retracted position corresponding to said valve assembly being in the second position and a spring for biasing said pin to the extended position, said pin engaging a contact surface on said inner body portion in said extended position and operatively coupling said outer body portion to said inner body portion.

16. The valve security device of claim 15 wherein said outer body portion includes a channel, said engagement pin being disposed in said channel and including a reduced diameter portion, and wherein said valve cap has a retaining member having a reduced diameter portion, wherein when said engagement pin is in said extended position, said reduced diameter portion of said engagement pin is adjacent said reduced diameter portion of said retaining member so as to permit removal of said valve cap from said outer body portion of said device, and wherein when said engagement pin is in said retracted position, said reduced diameter portion of said engagement pin is offset from said reduced diameter portion of said retaining member such that said engagement pin obstructs the movement of said retaining member to prevent removal of said valve cap from said outer body portion.

17. The valve security device of claim 16, further comprising a fastening member releasably securing said outer body portion to said inner body portion, said fastening member being disposed below and covered by said valve cap, wherein said fastening member is accessible by having the engagement pin in the extended position to permit removal of said valve cap.

18. The valve security device of claim 13 wherein said inner and outer body portions define overlapping portions and including a protective cylindrical sleeve disposed about said overlapping portions so as to prevent unauthorized access to said inner body portion and the valve actuator when said operating pin assembly is in said second position.

19. The valve security device of claim 18 wherein said sleeve is freely rotatable about said overlapping portions.

20. The valve security device of claim 13 including an attachment member carried by said inner body portion of said device and adapted to engage a portion of said fluid flow valve for securing said inner body portion to the actuator on the valve and wherein said outer body portion extends about said attachment member to prevent unauthorized access thereto when said operating pin assembly is in said second position.

21. The valve security device of claim 13 including a friction reducing member disposed about a portion of said inner body portion of said security device and between said inner and outer body portions thereof.

22. A valve security device for use with a lock of the type having a locking bar, said device comprising:
an inner body portion adapted to be disposed about and engage a valve actuator of a fluid flow valve;
an outer body portion disposed about and rotatably mounted on the inner body and defining a locking channel therein;
a valve cap defining a secondary actuator thereon and being removably secured to said outer body portion for rotation therewith;
an operating pin assembly carried by said outer body portion and movable between a first position and a second position, in said first position said pin assembly operatively couples said outer body portion to said inner body portion to allow actuation of the valve actuator via the valve cap, and in said second locked position, said pin assembly uncouples said outer body portion from said inner body portion so that said outer body portion is freely rotatable relative to said inner body portion and actuation of the valve actuator via the valve cap is prevented; and
wherein upon inserting the locking bar through said locking channel when the operating pin assembly is in the second position said locking channel is at least partially obstructed and movement of said pin assembly from said second position is prevented.

23. The valve security device of claim 22 wherein said pin assembly operatively couples said valve cap to said outer body portion to prevent removal of said valve cap from said outer body portion and said outer body portion from said inner body portion.

24. The valve security device of claim 22 wherein said operating pin assembly includes an engagement pin, a handle for moving said pin between an extended position corresponding to the pin assembly being in said first position and a retracted position corresponding to said valve assembly being in the second position and a spring for biasing said pin to the extended position, said pin engaging a contact surface on said inner body portion in said extended position and operatively coupling said outer body portion to said inner body portion.

25. The valve security device of claim 24 wherein said outer body portion includes a channel, said engagement pin being disposed in said channel and including a reduced diameter portion, and wherein said valve cap has a retaining member having a reduced diameter portion, wherein when said engagement pin is in said extended position, said reduced diameter portion of said engagement pin is adjacent said reduced diameter portion of said retaining member so as to permit removal of said valve cap from said outer body portion of said device, and wherein when said engagement pin is in said retracted position, said reduced diameter portion of said engagement pin is offset from said reduced diameter portion of said retaining member such that said engagement pin obstructs the movement of said retaining member to prevent removal of said valve cap from said outer body portion.

26. The valve security device of claim 25, further comprising a fastening member releasably securing said outer body portion to said inner body portion, said fastening member being disposed below and covered by said valve cap, wherein said fastening member is accessible by having the engagement pin in the extended position to permit removal of said valve cap.

27. The valve security device of claim 22 wherein said inner and outer body portions define overlapping portions and including a protective cylindrical sleeve disposed about said overlapping portions so as to prevent unauthorized access to said inner body portion and the valve actuator when said operating pin assembly is in said second position.

28. The valve security device of claim 27 wherein said sleeve is freely rotatable about said overlapping portions.

29. The valve security device of claim 22 including an attachment member carried by said inner body portion of said device and adapted to engage a portion of said fluid flow valve for securing said inner body portion to the actuator on the valve and wherein said outer body portion extends about said attachment member to prevent unauthorized access thereto when said operating pin assembly is in said second position.

30. The valve security device of claim 22 including a friction reducing member disposed about a portion of said inner body portion of said security device and between said inner and outer body portions thereof.

* * * * *